United States Patent
Zhu et al.

(10) Patent No.: US 12,349,044 B2
(45) Date of Patent: Jul. 1, 2025

(54) SERVICE PROCESSING METHOD, DEVICE, AND SYSTEM

(71) Applicant: HUAWEI TECHNOLOGIES CO., LTD., Guangdong (CN)

(72) Inventors: Hualin Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/715,512

(22) Filed: Apr. 7, 2022

(65) Prior Publication Data

US 2022/0232455 A1   Jul. 21, 2022

Related U.S. Application Data

(63) Continuation of application No. PCT/CN2019/110376, filed on Oct. 10, 2019.

(51) Int. Cl.
*H04W 48/04*   (2009.01)
*H04W 4/021*   (2018.01)
(Continued)

(52) U.S. Cl.
CPC .......... *H04W 48/04* (2013.01); *H04W 4/021* (2013.01); *H04W 4/029* (2018.02);
(Continued)

(58) Field of Classification Search
CPC ..... H04W 48/04; H04W 4/029; H04W 4/021; H04W 36/32; H04W 60/04
See application file for complete search history.

(56) References Cited

U.S. PATENT DOCUMENTS

2013/0053073 A1   2/2013   Zhao et al.
2018/0324740 A1*  11/2018  Edge ............. H04W 64/00
(Continued)

FOREIGN PATENT DOCUMENTS

CN   101860988 A   10/2010
CN   102457938 A   5/2012
(Continued)

OTHER PUBLICATIONS

3GPP TS 23.501 v15.6.0 (Jun. 2019) 3rd Generation Partnership Project: Technical Specification Group Services and System Aspects; System Architecture for the 5G System; Stage 2 (Release 15), pp. 1-11 and 48-63. (Year: 2019).*

(Continued)

*Primary Examiner* — Melvin C Marcelo
(74) *Attorney, Agent, or Firm* — Fish & Richardson P.C.

(57) ABSTRACT

The disclosure provides service processing methods. One example method includes that a first network element sends a first message to a second network element, where the first message is used to request to obtain location information of a terminal device. The first network element obtains the location information from the second network element, then the first network element determines, based on the location information, whether the terminal device is located in a first non-restricted area. The first network element allows the terminal device to obtain a service if the terminal device is located in the first non-restricted area or the first network element disallows the terminal device to obtain a service if the terminal device is not located in the first non-restricted area.

20 Claims, 11 Drawing Sheets

(51) Int. Cl.
*H04W 4/029* (2018.01)
*H04W 36/32* (2009.01)
*H04W 60/04* (2009.01)
*H04W 36/00* (2009.01)

(52) U.S. Cl.
CPC ......... *H04W 36/322* (2023.05); *H04W 60/04* (2013.01); *H04W 36/0055* (2013.01)

(56) References Cited

U.S. PATENT DOCUMENTS

2019/0116486 A1* 4/2019 Kim ................. H04W 8/10
2021/0314849 A1* 10/2021 Tiwari ............... H04W 48/04

FOREIGN PATENT DOCUMENTS

| CN | 104243406 A | 12/2014 |
| CN | 104507131 A | 4/2015 |
| CN | 110062328 A | 7/2019 |
| EP | 3661315 A1 | 6/2020 |
| WO | 2011147156 A1 | 12/2011 |
| WO | 2019033817 A1 | 2/2019 |

OTHER PUBLICATIONS

Extended European Search Report issued in European Application No. 19948638.2 on Sep. 26, 2022, 16 pages.
Huawei, HiSilicon, "Clarification on the Misalignment of Service Area Restriction Between UE and Network," 3GPP TSG-SA WG2 Meeting #134, S2-1907840, Sapporo, Japan, Jun. 24-28, 2019, 4 pages.
Huawei, HiSilicon, "Completion of 5GC-MO-LR Procedure for TS 23.273," 3GPP TSG-SA2 Meeting #134, S2-1908025, Sapporo, Japan, Jun. 24-28, 2019, 4 pages.
PCT International Search Report and Written Opinion issued in International Application No. PCT/CN2019/110376 on Jun. 30, 2020, 15 pages (with English translation).

* cited by examiner

SERVICE PROCESSING METHOD, DEVICE, AND SYSTEM

CROSS-REFERENCE TO RELATED APPLICATION

This application is a continuation of International Application No. PCT/CN2019/110376, filed on Oct. 10, 2019. The disclosure of the aforementioned application is hereby incorporated by reference in its entirety.

TECHNICAL FIELD

This application relates to the communication field, and in particular, to a service processing method, a device, and a system.

BACKGROUND

Currently, in a mobile communication system, a range in which a network device performs service management on a terminal device includes several cells.

However, a cell corresponds to a very large geographical range that has a diameter usually ranging from hundreds of meters to several kilometers. Therefore, in current technologies, the service management is performed on the terminal device in a large geographical range, and a diameter of the geographical range may be as long as dozens of kilometers. Consequently, the service management performed by the network device on the terminal device is not refined enough.

SUMMARY

Embodiments of this application provide a service processing method, a device, and a system, to perform more refined service management on a terminal device.

To achieve the foregoing objective, the following technical solution is used in embodiments of this application.

According to a first aspect, a service processing method is provided. The method includes: A first network element sends a first message to a second network element, where the first message is used to request to obtain location information of a terminal device; the first network element receives the location information from the second network element; the first network element determines, based on the location information, whether the terminal device is located in a first non-restricted area; and the first network element allows the terminal device to obtain a service if the terminal device is located in the first non-restricted area; or the first network element disallows the terminal device to obtain a service if the terminal device is not located in the first non-restricted area. In this solution, the first network element can perform service management on the terminal device based on the location information of the terminal device, and therefore can perform refined service management on the terminal device in a small geographical range. This avoids a problem in the current technologies that service management on the terminal device is not refined enough.

In a possible design, the first network element includes an access and mobility management function network element or a session management function network element, and the second network element includes a location management function network element.

In a possible design, before the first network element sends the first message to the second network element, the method further includes: The first network element determines that the terminal device is located in a second non-restricted area, where a range of the second non-restricted area is a tracking area range or a cell range. To be specific, after determining that the terminal device is located in the second non-restricted area, the first network element obtains the location information of the terminal device, and then performs service management on the terminal device based on the location information of the terminal device. Therefore, based on this solution, the first network element can be prevented from performing an unnecessary procedure, thereby reducing consumed network resources.

Optionally, a range of the first non-restricted area is smaller than the range of the second non-restricted area.

In a possible design, after that the first network element determines that the terminal device is located in a second non-restricted area, the method further includes: The first network element sends a registration accept message to the terminal device, where the registration accept message carries first indication information, and the first indication information is used to indicate that the terminal device is not allowed to obtain the service currently. Based on this solution, before the first network element determines that the terminal device is located in the first non-restricted area, the terminal device is not allowed to obtain the service.

In a possible design, that the first network element allows the terminal device to obtain a service includes: The first network element sends second indication information to the terminal device, where the second indication information is used to indicate the terminal device to resume obtaining the service. Based on this solution, as indicated by the second indication information, the terminal device is allowed to obtain the service.

In a possible design, before that the first network element determines, based on the location information, whether the terminal device is located in a first non-restricted area, the method further includes: The first network element rejects the terminal device to obtain the service if the first network element receives a second message from the terminal device, where the second message is used to request to establish a session or the second message is used to request the service. Based on this solution, before the first network element determines that the terminal device is located in the first non-restricted area, the terminal device is not allowed to obtain the service.

In a possible design, after that the first network element determines that the terminal device is located in a second non-restricted area, the method further includes: The first network element performs a handover procedure on the terminal device; and correspondingly, that a first network element sends a first message to a second network element includes: The first network element sends the first message to the second network element after determining that the handover procedure on the terminal device is completed. To be specific, in a handover scenario, when the terminal device is located in the second non-restricted area, the terminal device may be first handed over, and after the handover is completed, specific location information of the terminal device is obtained, and service processing is performed on the terminal device based on the location information.

In a possible design, after that the first network element determines that the terminal device is located in a second non-restricted area, the method further includes: The first network element sends third indication information to a third network element, where the third indication information is used to indicate that the third network element is not capable of transmitting user plane data of the terminal device currently. The third network element includes a user plane function network element or an access network element accessed by the terminal device after handover. To be specific, in a handover scenario, although the terminal device is allowed to be handed over, the user plane data of the terminal device is not transmitted before the first network element determines that the terminal device is located in the first non-restricted area. In this case, the terminal device is not allowed to obtain the service.

In a possible design, that the first network element allows the terminal device to obtain a service includes: The first network element sends fourth indication information to the third network element, where the fourth indication information is used to indicate the third network element to resume transmitting the user plane data of the terminal device. Based on this solution, as indicated by the fourth indication information, transmission of the user plane data of the terminal device may be resumed. In this case, the terminal device is allowed to obtain the service.

In a possible design, that the first network element receives the location information from the second network element includes: The first network element receives the location information periodically sent by the second network element. Based on this solution, each time the first network element receives the location information of the terminal device, real-time service processing may be performed on the terminal device according to the method.

Optionally, the method is used in a session establishment procedure, a service request procedure, a registration procedure, or a handover procedure.

Optionally, when the method is used in a session establishment procedure, that the first network element allows the terminal device to obtain a service includes: The first network element allows the terminal device to perform the session establishment procedure; and that the first network element disallows the terminal device to obtain a service includes: The first network element initiates a session deletion procedure or rejects the session establishment procedure. That the first network element rejects the session establishment procedure specifically includes: The first network element sends a third message to the terminal device, where the third message is used to notify the terminal device that the first network device has rejected to establish a session; or the first network element sends a third message to the session management function network element, where the third message is used to notify the session management function network element to reject to establish a session.

Optionally, when the method is used in a service request procedure, that the first network element determines to allow the terminal device to obtain a service includes: The first network element allows terminal device to perform the service request procedure; and that the first network element determines to disallow the terminal device to obtain a service includes: The first network element initiates an access network release procedure or rejects the service request procedure.

Optionally, after the first network element determines that the terminal device is not located in the first non-restricted area, the method further includes: The first network element sends the location information of the terminal device to the session management function network element. Based on this solution, after the session management function network element obtains information of the first non-restricted area by using session subscription information, whether the terminal device is currently located in the first non-restricted area may be determined, and a session establishment request of the terminal device is rejected when the terminal device is not located in the first non-restricted area.

According to a second aspect, a first network element is provided. The first network element may implement the method in any one of the first aspect or the possible designs of the first aspect. The first network element includes a corresponding module, unit, or means (means) for implementing the foregoing method. The module, unit, or means may be implemented by hardware or software, or may be implemented by hardware executing corresponding software. The hardware or the software includes one or more modules or units corresponding to the foregoing functions.

According to a third aspect, a communication apparatus is provided. The communication apparatus includes a processor and a memory. The memory is configured to store computer instructions, and when the processor executes the instructions, the communication apparatus is enabled to perform the method according to any one of the foregoing aspects. The communication apparatus may be the first network element in the first aspect, or an apparatus including the first network element.

According to a fourth aspect, a communication apparatus is provided. The communication apparatus includes a processor. The processor is configured to: perform the method in the first aspect based on the instructions after the processor is coupled to a memory and reads instructions in the memory. The communication apparatus may be the first network element in the first aspect, or an apparatus including the first network element.

According to a fifth aspect, a computer-readable storage medium is provided. The computer-readable storage medium stores instructions. When the instructions are run on a computer, the computer is enabled to perform the method in the first aspect.

According to a sixth aspect, a computer program product including instructions is provided. When the computer program product is run on a computer, the computer is enabled to perform the method in the first aspect.

According to a seventh aspect, a communication apparatus (for example, the communication apparatus may be a chip or a chip system) is provided. The communication apparatus includes a processor, configured to implement a function in any one of the foregoing aspects. In a possible design, the communication apparatus further includes a memory, and the memory is configured to store necessary program instructions and data. When the communication apparatus is a chip system, the communication apparatus may include a chip, or may include a chip and another discrete component.

According to an eighth aspect, a communication system is provided. The communication system includes the first network element in the second aspect and a second network element. The second network element is configured to: receive a first message from the first network element, and send location information of a terminal device to the first network element.

For technical effects brought by any one of the designs of the second aspect to the eighth aspect, refer to the technical effects brought by the different designs of the first aspect. Details are not described herein again.

DESCRIPTION OF EMBODIMENTS

The following describes technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship between associated objects and represents that three relationships may exist. For example, A and/or B may represent the following three cases: Only A exists, both A and B exist, and only B exists, where A or B may be singular or plural. In addition, in the descriptions of this application, unless otherwise stated, "a plurality of" means two or more than two. "At least one of the following items (pieces)" or a similar expression thereof means any combination of these items, including any combination of a singular item (piece) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a related concept in a specific manner for ease of understanding.

Figure 1:
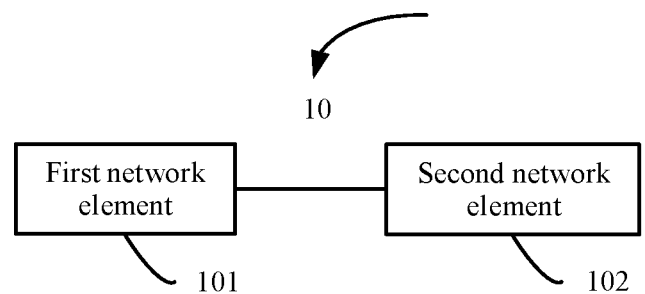
FIG. 1 is a schematic diagram of a structure of a communication system according to an embodiment of this application.

FIG. 1 shows a communication system 10 according to an embodiment of this application. The communication system 10 includes a first network element 101 and a second network element 102. The first network element 101 and the second network element 102 may directly communicate with each other, or may communicate with each other through forwarding performed by another device. This is not specifically limited in this embodiment of this application.

The first network element 101 is configured to send a first message to the second network element 102, where the first message is used to request to obtain location information of a terminal device. The second network element 102 is configured to: receive the first message from the first network element 101, and send the location information of the terminal device to the first network element 101. The first network element 101 is further configured to: receive the location information from the second network element 102, and determine, based on the location information, whether the terminal device is located in a first non-restricted area. The first network element 101 is further configured to allow the terminal device to obtain a service if the terminal device is located in the first non-restricted area. Alternatively, the first network element 101 is further configured to disallow the terminal device to obtain a service if the terminal device is not located in the first non-restricted area. A specific implementation of the foregoing solution is described in detail in subsequent method embodiments. Details are not described herein.

In this embodiment of this application, after sending, to the second network element, the first message for requesting to obtain the location information of the terminal device, the first network element can obtain the location information of the terminal device. Therefore, the first network element can determine, based on the location information of the terminal device, whether the terminal device is located in the first non-restricted area. If the terminal device is located in the first non-restricted area, the first network element allows the terminal device to obtain the service; otherwise, the first network element disallows the terminal device to obtain the service. In other words, in this embodiment of this application, the first network element can perform service management on the terminal device based on the location information of the terminal device, and therefore can perform refined service management on the terminal device in a small geographical range. This avoids a problem in the current technologies that service management on the terminal device is not refined enough.

Figure 2:
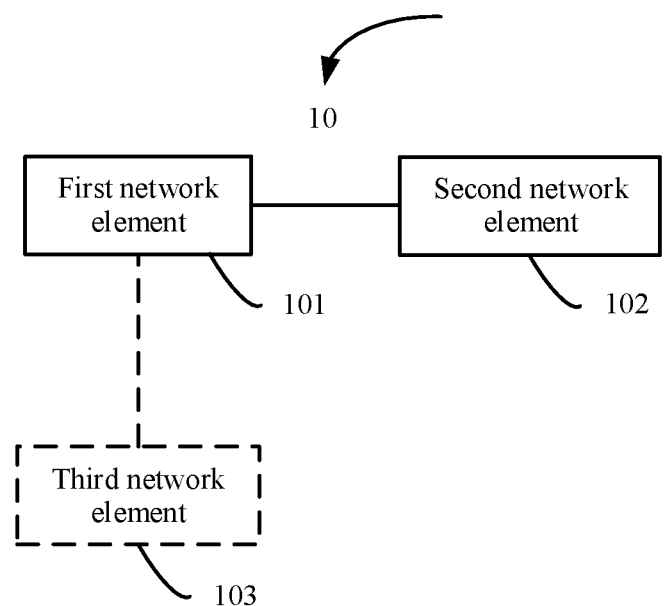
FIG. 2 is a schematic diagram of a structure of another communication system according to an embodiment of this application.

Optionally, as shown in FIG. 2, the communication system 10 provided in this embodiment of this application may further include a third network element 103 in addition to the first network element 101 and the second network element 102 that are shown in FIG. 1. The third network element 103 is a user plane network element or a target access network network element of the terminal device.

The first network element 101 is further configured to send third indication information to the third network element 103, where the third indication information is used to indicate that the third network element 103 is not capable of transmitting user plane data of the terminal device currently. The third network element 103 is configured to: receive the third indication information from the first network element 101, and discard the user plane data of the terminal device as indicated by the third indication information.

Optionally, the first network element 101 is further configured to send fourth indication information to the third network element 103, where the fourth indication information is used to indicate the third network element 103 to resume transmitting the user plane data of the terminal device. The third network element 103 is further configured to: receive the fourth indication information from the first network element 101, and resume transmitting the user plane data of the terminal device as indicated by the fourth indication information.

In addition, it should be noted that the network architecture described in embodiments of this application is intended to describe the technical solutions in embodiments of this application more clearly, and do not constitute a limitation on the technical solutions provided in embodiments of this application. A person of ordinary skill in the art may know that, with the evolution of the network architecture, the technical solutions provided in embodiments of this application are also applicable to similar technical problems. For example, the communication system 10 shown in FIG. 1 may be applied to a current 5th generation (5th generation, 5G) mobile network, or may be applied to a long term evolution (long term evolution, LTE) mobile network, a MulteFire network, a home base station network, a mobile network accessed through Wi-Fi, a future (6th generation, 6G) network, or a fixed-mobile convergence network. This is not specifically limited in embodiments of this application.

Figure 3:
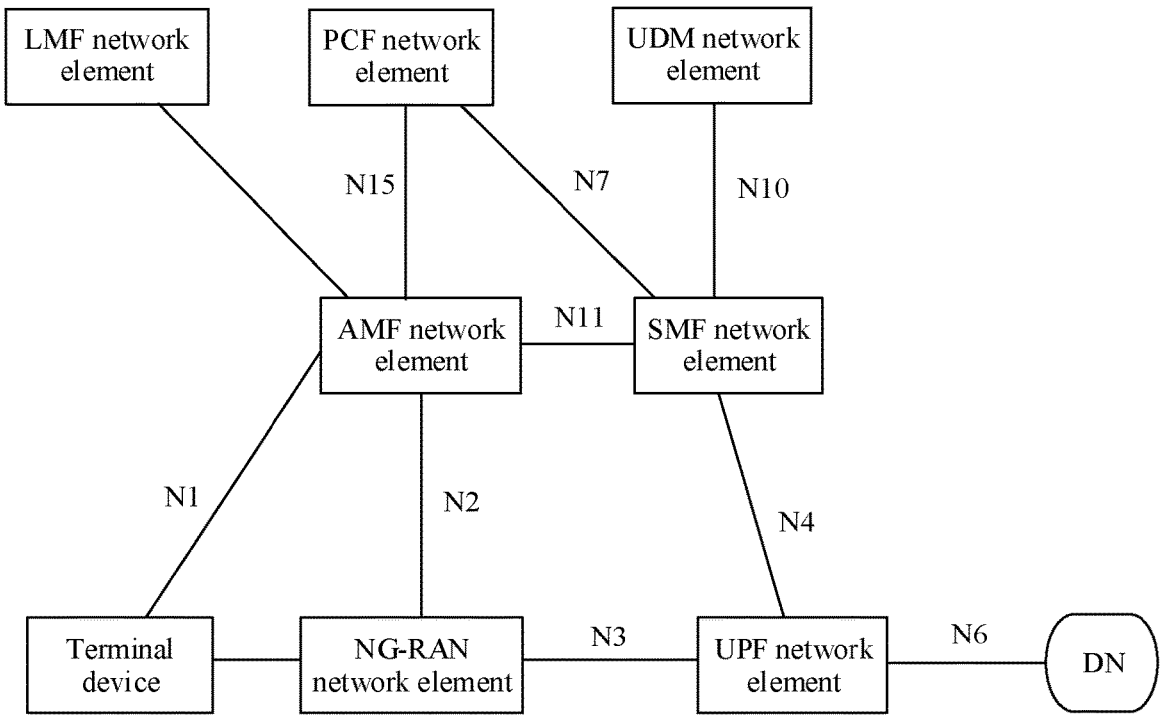
FIG. 3 is a schematic diagram of a network architecture of a 5G network.

For example, it is assumed that the communication system 10 shown in FIG. 1 is applied to a current 5G network. As shown in FIG. 3, a network element or an entity corresponding to the foregoing first network element 101 may be an access and mobility management function (access and mobility management function, AMF) network element or a session management function (session management function, SMF) network element in the 5G network; a network element or an entity corresponding to the second network element 102 may be a location management function (location management function, LMF) network element in the 5G network; a network element or an entity corresponding to the access network element may be a next generation radio access network (next generation RAN, NG-RAN) network element in the 5G network; a network element or an entity corresponding to the user plane network element may be a user plane function (user plane function, UPF) network element in the 5G network.

In addition, as shown in FIG. 3, the 5G network may further include a policy control function (policy control function, PCF) network element, a unified data management (unified data management, UDM) network element, and the like. This is not specifically limited in embodiments of this application.

As shown in FIG. 3, the terminal device communicates with the AMF network element by using an N1 interface (N1 for short), the next generation access network element communicates with the AMF network element by using an N2 interface (N2 for short), the next generation access network element communicates with the UPF network element by using an N3 interface (N3 for short), the UPF network element communicates with a data network (data network, DN) by using an N6 interface (N6 for short), the AMF network element communicates with the PCF network element by using an N15 interface (N15 for short), the AMF network element communicates with the SMF network element by using an N11 interface (N11 for short), the SMF network element communicates with the PCF network element by using an N7 interface (N7 for short), the SMF network element communicates with the UDM network element by using an N10 interface (N10 for short), and the SMF network element communicates with the UPF network element by using an N4 interface (N4 for short).

It should be noted that the LMF network element may be independently deployed, or may be deployed on a device together with the AMF network element, the next generation access network element, or the SMF network element. This is not specifically limited in embodiments of this application.

Optionally, a related function of the first network element 101 in embodiments of this application may be implemented by one device, or may be jointly implemented by a plurality of devices, or may be implemented by one or more functional modules in one device. This is not specifically limited in embodiments of this application. It may be understood that the foregoing function may be a network element in a hardware device, or may be a software function running on dedicated hardware, or may be a combination of hardware and software, or may be a virtualization function instantiated on a platform (for example, a cloud platform).

Figure 4:
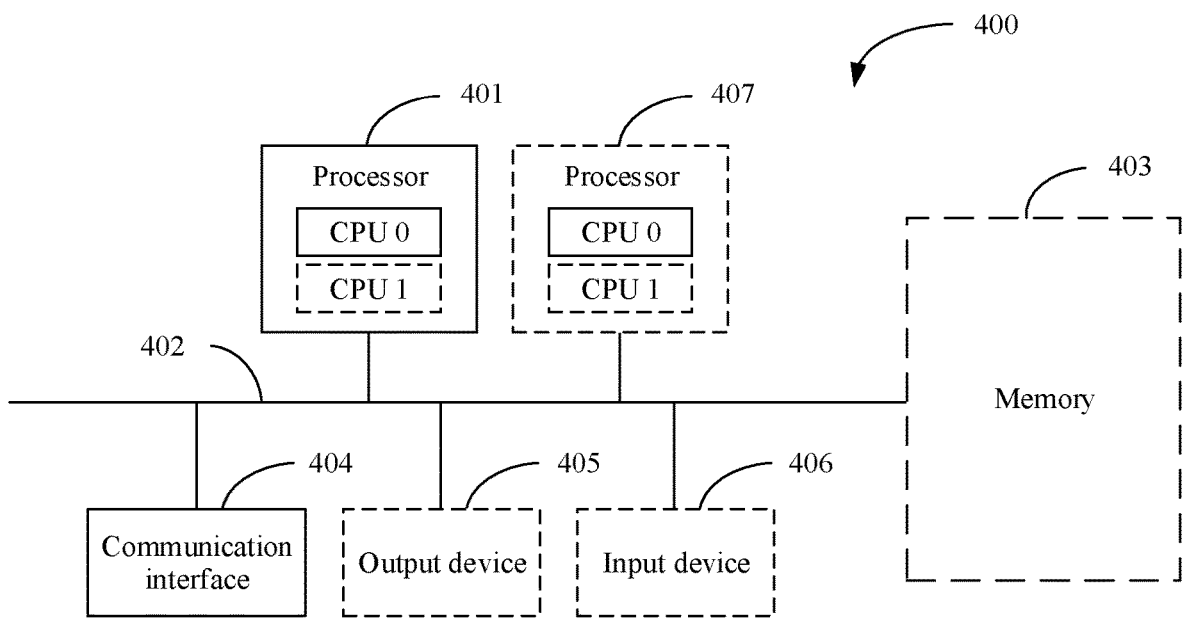
FIG. 4 is a schematic diagram of a structure of a communication apparatus according to an embodiment of this application.

For example, the related function of the first network element 101 in embodiments of this application may be implemented by a communication device 400 in FIG. 4. FIG. 4 is a schematic diagram of a structure of the communication device 400 according to an embodiment of this application. The communication device 400 includes one or more processors 401, a communication line 402, and at least one communication interface (where in FIG. 4, an example in which a communication interface 404 and one processor 401 are included is merely used for description), and optionally, may further include a memory 403.

The processor 401 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 402 may include a path for connecting different components.

The communication interface 404 may be a transceiver module, configured to communicate with another device or a communication network, such as the Ethernet, a RAN, or a wireless local area network (wireless local area network, WLAN). For example, the transceiver module may be an apparatus such as a transceiver or a transceiver. Optionally, the communication interface 404 may alternatively be a transceiver circuit located in the processor 401, and is configured to implement signal input and signal output of the processor.

The memory 403 may be an apparatus having a storage function. For example, the memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (which includes a compact disc, a laser disc, an optical disc, a digital versatile disc, a Blu-ray disc, and the like), a magnetic disk storage medium or another magnetic storage device, or any other medium that can be used to carry or store expected program code having an instruction or a data structure form and that can be accessed by a computer. However, this is not limited herein. The memory may exist independently, and is connected to the processor through the communication line 402. Alternatively, the memory may be integrated with the processor.

The memory 403 is configured to store computer-executable instructions for executing the solutions in this application, and the processor 401 controls execution. The processor 401 is configured to execute the computer-executable instructions stored in the memory 403, to implement the service processing method provided in embodiments of this application.

Alternatively, optionally, in this embodiment of this application, the processor 401 may perform functions related to processing in the service processing method provided in the following embodiments of this application. The communication interface 404 is responsible for communicating with another device or a communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 401 may include one or more CPUs, for example, CPU 0 and CPU 1 in FIG. 4.

During specific implementation, in an embodiment, the communication device 400 may include a plurality of processors, for example, the processor 401 and a processor 407 in FIG. 4. Each of these processors may be a single-core (single-CPU) processor, or may be a multi-core (multi-CPU) processor. The processor herein may be one or more devices or circuits, and/or processing cores configured to process data (for example, computer program instructions).

During specific implementation, in an embodiment, the communication device 400 may further include an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, a projector (projector), or the like. The input device 406 communicates with the processor 401, and may receive an input of a user in a plurality of manners. For example, the input device 406 may be a mouse, a keyboard, a touchscreen device, a sensor device, or the like.

The communication device 400 may also be referred to as a communication apparatus sometimes, and may be a general-purpose device or a dedicated device. For example, the communication device 400 may be a desktop computer, a portable computer, a network server, a personal digital assistant (personal digital assistant, PDA), a mobile phone, a tablet computer, a wireless terminal device, an embedded device, a residential gateway (residential gateway, RG), the foregoing terminal device, the foregoing network device, or a device having a structure similar to that in FIG. 4. A type of the communication device 400 is not limited in this embodiment of this application.

The service management method provided in embodiments of this application is specifically described with reference to FIG. 1 to FIG. 4.

It should be noted that the service processing method provided in embodiments of this application may be used in a session establishment procedure, a service request procedure, a registration procedure, a handover procedure, or the like. In addition, names of messages between network elements, names of parameters in the messages, or the like in the following embodiments of this application are merely examples, and may be other names in specific implementation. This is not specifically limited in embodiments of this application.

Figure 5:
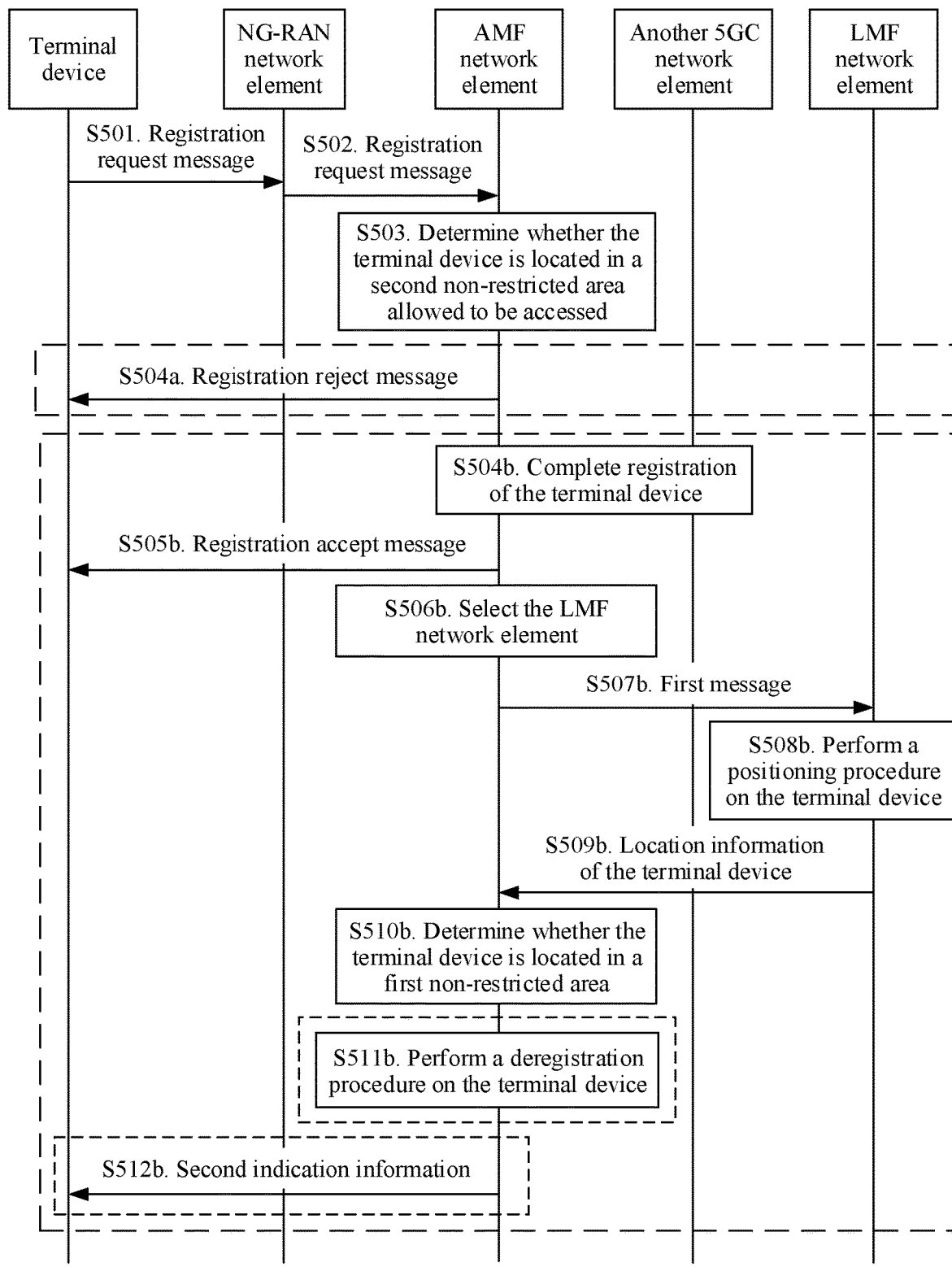
FIG. 5 is a schematic flowchart 1 of a service processing method according to an embodiment of this application.

For example, the communication system shown in FIG. 1 is applied to the 5G network shown in FIG. 3, the first network element is the AMF network element, and the second network element is the LMF network element. FIG. 5 shows a service processing method according to an embodiment of this application. The service processing method may be applied to a registration procedure, and includes the following steps.

S501. A terminal device sends a registration request message to an NG-RAN network element; and the NG-RAN network element receives the registration request message from the terminal device.

S502. The NG-RAN network element selects an AMF network element, and sends the registration request message to the AMF network element; and the AMF network element receives the registration request message from the NG-RAN.

S503. The AMF network element determines whether the terminal device is located in a second non-restricted area allowed to be accessed.

A range of the second non-restricted area is a tracking area range or a cell range. The second non-restricted area is used to limit an access range in which a network side device allows the terminal device to access, and may be a geographical range in which service processing is performed on the terminal device in current technologies. Optionally, the AMF network element may obtain information of the second non-restricted area from a UDM network element or a PCF network element. This is not specifically limited in this embodiment of this application.

For example, if the second non-restricted area is a tracking area range, the AMF network element may determine, by determining whether a cell in which the terminal device is currently located belongs to the tracking area range, whether the terminal device is located in the second non-restricted area. If the second non-restricted area is a cell range, the AMF network element may determine, by determining whether a cell in which the terminal device is currently located is a cell corresponding to the second non-restricted area, whether the terminal device is located in the second non-restricted area.

For related implementation of steps S501 to S503, refer to the current technologies. Details are not described herein.

Further, based on the foregoing step S503, after determining that the terminal device is not located in the second non-restricted area, the AMF network element directly sends a registration reject message to the terminal device, and no longer registers the terminal device (for example, step S504a in FIG. 5). After determining that the terminal device is located in the second non-restricted area, the AMF network element registers the terminal device, obtains location information of the terminal device from the second network element, and performs service processing on the terminal device based on the location information of the terminal device (that is, performs steps S504b to S512b in FIG. 5). In this way, network resource consumption caused by performing an unnecessary procedure (such as a registration procedure or a positioning process) by the AMF network element can be avoided.

As shown in FIG. 5, step S504a includes:

S504a. The AMF network element sends a registration reject message to the terminal device; and the terminal device receives the registration reject message from the AMF network element.

For related implementation of step S504a, refer to the current technologies. Details are not described herein.

As shown in FIG. 5, steps S504b to S510b are as follows:

S504b. The AMF network element and another related 5G core (5G core, 5GC) network element complete registration of the terminal device.

S505b. The AMF network element sends a registration accept message to the terminal device; and the terminal device receives the registration accept message from the AMF network element.

The registration accept message carries first indication information, and the first indication information is used to indicate that the terminal device is not allowed to obtain a service currently. For example, the first indication information may be specifically a service forbidden indication (service forbidden indication). This is not specifically limited in this embodiment of this application. Optionally, the registration accept message may further carry a cause value, and the cause value is used to indicate that a network does not identify that the terminal device is located in a first non-restricted area.

It should be noted that, in this embodiment of this application, that the terminal device is not allowed to obtain a service currently specifically means that the terminal device is not allowed to obtain the service by performing a session establishment procedure and/or a service request procedure.

S506b. The AMF network element selects an LMF network element.

S507b. The AMF network element sends a first message to the LMF network element; and the LMF network element receives the first message from the AMF network element.

The first message is used to request to obtain the location information of the terminal device. For example, the first message may be, for example, a positioning request message (Nlmf_location_Determinlocation Request), and the positioning request message is used to request to periodically perform a location service (location services, LCS) on the terminal device. Optionally, the positioning request message may further include a periodicity value for performing the LCS.

S508b. The LMF network element performs a positioning procedure on the terminal device, to obtain the location information of the terminal device.

In a possible implementation, the LMF network element may periodically perform the LCS on the terminal device to obtain the location information of the terminal device.

S509b. The LMF network element sends the location information of the terminal device to the AMF network element; and the AMF network element receives the location information of the terminal device from the LMF network element.

It should be noted that in this embodiment of this application, if the LMF network element periodically performs the LCS on the terminal device to obtain the location information of the terminal device, step S509b needs to be performed each time after the LMF network element obtains the location information of the terminal device. To be specific, the LMF network element periodically sends the location information of the terminal device to the AMF network element, and the AMF network element receives the location information of the terminal device periodically sent by the LMF network element.

S510b. The AMF network element determines, based on the location information of the terminal device, whether the terminal device is located in the first non-restricted area.

A range of the first non-restricted area is smaller than the range of the second non-restricted area. For example, the range of the first non-restricted area may be limited by using latitude and longitude information, administrative region information, or location information defined by an operator. This is not specifically limited in this embodiment of this application. Optionally, the AMF network element may obtain information of the first non-restricted area from a UDM network element or a PCF network element. This is not specifically limited in this embodiment of this application.

In a possible implementation, if the terminal device is not located in the first non-restricted area, the service processing method provided in this embodiment of this application includes the following step S511b:

S511b. The AMF network element performs a deregistration procedure on the terminal device.

To be specific, the AMF network element performs the deregistration procedure on the terminal device, to disallow the terminal device to obtain the service.

Alternatively, in another possible implementation, if the terminal device is located in the first non-restricted area, the service processing method provided in this embodiment of this application includes the following step S512b:

S512b. The AMF network element sends second indication information to the terminal device; and the terminal device receives the second indication information from the AMF network element.

The second indication information is used to indicate the terminal device to resume obtaining the service. For example, the second indication information may be specifically a service forbidden cancel indication (service forbidden cancel indication). This is not specifically limited in this embodiment of this application.

To be specific, the AMF network element sends the second indication information to the terminal device, to allow the terminal device to obtain the service. It should be noted that, in this embodiment of this application, allowing the terminal device to obtain the service is specifically allowing the terminal device to obtain the service by performing the session establishment procedure and/or the service request procedure.

Optionally, in this embodiment of this application, before that the AMF network element determines, based on the location information of the terminal device, whether the terminal device is located in the first non-restricted area (that is, step S510b), the service processing method provided in this embodiment of this application further includes: If the AMF network element receives a second message from the terminal device, the AMF network element rejects the terminal device to obtain the service. The second message is used to request to establish a session, or the second message is used to request the service.

To be specific, before the AMF network element determines whether the terminal device is located in the first non-restricted area, if the AMF network element receives a session establishment request or a service request of the terminal device, the AMF network element rejects the session establishment request or the service request of the terminal device, to disallow the terminal device to obtain the service.

In this embodiment of this application, the AMF network element can obtain the location information from the LMF network element by sending, to the LMF network element, the first message for requesting to obtain the location information of the terminal device, so that the AMF network element determines, based on the location information of the terminal device, whether the terminal device is located in the first non-restricted area. If the terminal device is located in the first non-restricted area, the AMF network element sends the second indication information to the terminal device to allow the terminal device to obtain the service. Otherwise, the AMF network element performs the deregistration procedure on the terminal device to disallow the terminal device to obtain the service. In other words, in this embodiment of this application, the AMF network element can perform service management on the terminal device based on the location information of the terminal device, and therefore can perform refined service management on the terminal device in a small geographical range. This avoids a problem in the current technologies that service management on the terminal device is not refined enough.

Actions of the AMF network element in steps S501 to S512b may be performed by the processor 401 in the communication device 400 shown in FIG. 4 by invoking the application program code stored in the memory 403. This is not limited in this embodiment.

Figure 6A:
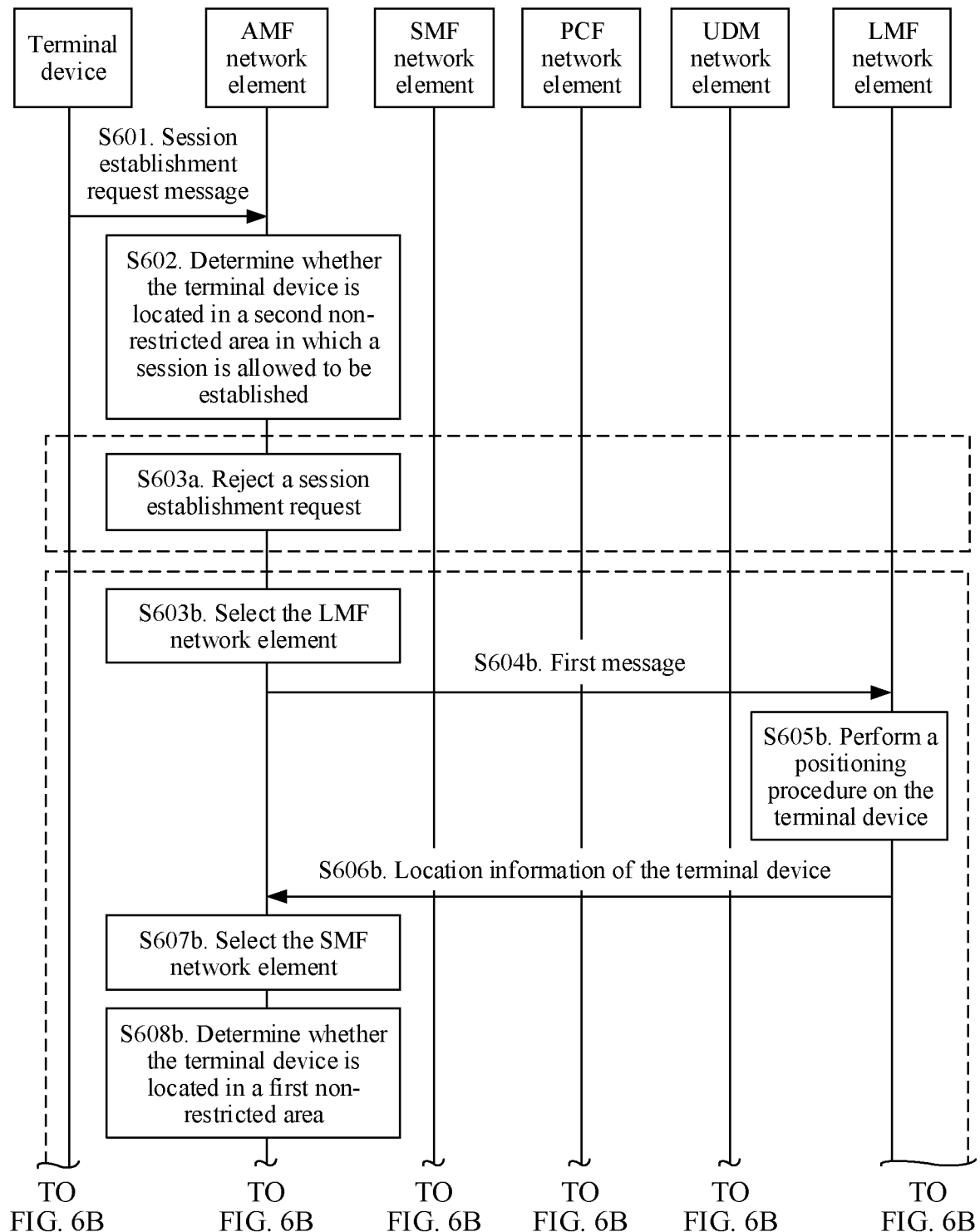
FIG. 6A and FIG. 6B are a schematic flowchart 2 of a service processing method according to an embodiment of this application.
Figure 6B:
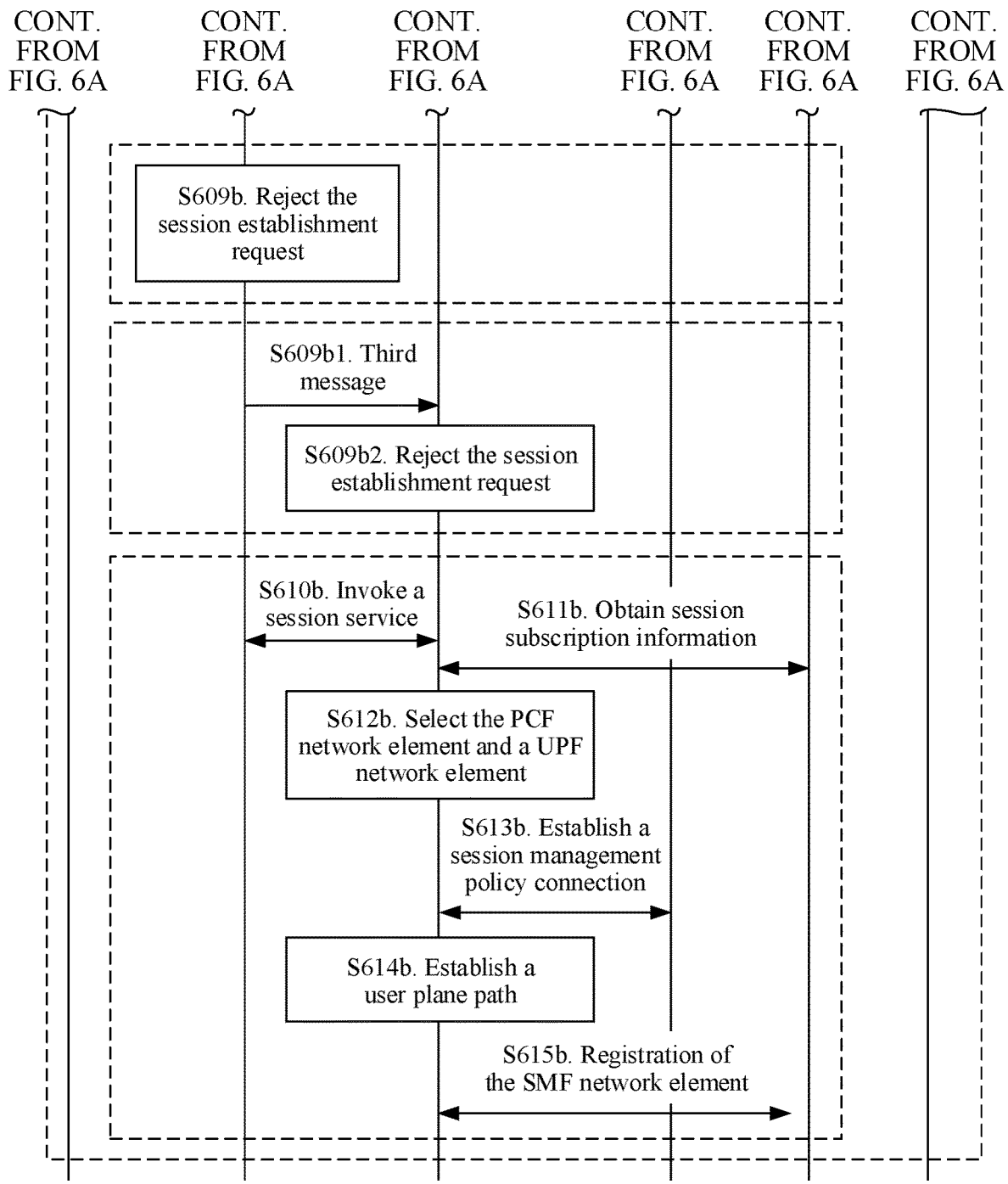

Optionally, for example, the communication system shown in FIG. 1 is applied to the 5G network shown in FIG. 3, the first network element is the AMF network element, and the second network element is the LMF network element. FIG. 6A and FIG. 6B show a service processing method according to an embodiment of this application. The service processing method may be applied to a session establishment procedure, and includes the following steps.

S601. A terminal device sends a session establishment request message to an AMF network element; and the AMF network element receives the session establishment request message from the terminal device.

S602. The AMF network element determines whether the terminal device is located in a second non-restricted area in which the terminal device is allowed to establish a session.

For related implementation of step S602, refer to step S503 in the embodiment shown in FIG. 5. Details are not described herein again.

In a possible implementation, if the AMF network element determines that the terminal device is not located in the second non-restricted area, the service processing method provided in this embodiment of this application includes the following step S603a:

S603a. The AMF network element rejects a session establishment request.

For related implementation of steps S601 to S603a, refer to current technologies. Details are not described herein.

In another possible implementation, if the AMF network element determines that the terminal device is located in the second non-restricted area, the following steps S603b to S615b are performed.

S603b to S606b are the same as steps S506b to S509b in the embodiment shown in FIG. 5.

S607b. The AMF network element selects an SMF network element.

Specifically, the AMF network element may select an appropriate SMF network element for a session based on a data network name (data network name, DNN), single network slice selection assistance information (single network slice selection assistance information, S-NSSAI), subscription data, and the like. This is not specifically limited in this embodiment of this application.

S608b is the same as step S510b in the embodiment shown in FIG. 5.

In a possible implementation, if the AMF network element determines that the terminal device is not located in a first non-restricted area, the service processing method provided in this embodiment of this application includes the following step S609b:

S609b. The AMF network element rejects the session establishment request of the terminal device.

To be specific, if the AMF network element determines that the terminal device is not located in the first non-restricted area, the AMF network element disallow the terminal device to obtain a service by using the session establishment request. For example, the AMF network element may reject the session establishment request of the terminal device by stopping continuing performing the session establishment procedure or initiating a session deletion procedure, to disallow the terminal device to obtain the service.

Optionally, the AMF network element may further send a notification message to the terminal device, to notify the terminal device that the AMF network element has rejected the session establishment request of the terminal device.

In another possible implementation, if the AMF network element determines that the terminal device is not located in the first non-restricted area, the service processing method provided in this embodiment of this application further includes the following steps S609b1 and S609b2:

S609b1. The AMF network element sends a third message to the SMF network element; and the SMF network element receives the third message from the AMF network element.

The third message is used to indicate that the terminal device is not located in the first non-restricted area.

S609b2. The SMF network element rejects the session establishment request of the terminal device.

To be specific, after the AMF network element determines that the terminal device is not located in the first non-restricted area, the AMF network element notifies the SMF network element that the terminal device is not located in the first non-restricted area in which a session is allowed to be established. In this case, the SMF network element rejects the session establishment request of the terminal device.

Optionally, in a possible implementation, the AMF network element may further send location information of the terminal device to the SMF network element. After obtaining information of the first non-restricted area by using session subscription information, the SMF network element can determine whether the terminal device is currently located in the first non-restricted area, and reject the session establishment request of the terminal device when the terminal device is not located in the first non-restricted area.

In another possible implementation, if the terminal device is located in the first non-restricted area, the service processing method provided in this embodiment of this application includes the following steps S610b to S615b:

S610b. The AMF network element invokes a session service of the SMF network element, to trigger the session establishment procedure.

To be specific, if the terminal device is located in the first non-restricted area, the AMF network element allows the terminal device to obtain the service by using the session establishment procedure.

S611b. The SMF network element obtains session management subscription information from a UDM network element.

S612b. The SMF network element selects a PCF network element and a UPF network element for a session.

S613b. The SMF network element establishes a session management policy connection to the PCF network element, and obtains a session policy rule.

S614b. The SMF network element establishes a user plane path between the terminal device, an NG-RAN network element, and the UPF network element.

S615b. The SMF network element registers with the UDM network element.

In this embodiment of this application, the AMF network element can obtain the location information from the LMF network element by sending, to the LMF network element, the first message for requesting to obtain the location information of the terminal device, so that the AMF network element determines, based on the location information of the terminal device, whether the terminal device is located in the first non-restricted area. If the terminal device is located in the first non-restricted area, the AMF network element continues the session establishment procedure, so that the terminal device can obtain the service by using the session establishment procedure. If the terminal device is not located in the first non-restricted area, the AMF network element rejects the session establishment request of the terminal device, so that the terminal device is not allowed to obtain the service by using the session establishment procedure. In other words, in this embodiment of this application, the AMF network element can perform service management on the terminal device based on the location information of the terminal device, and therefore can perform refined service management on the terminal device in a small geographical range. This avoids a problem in the current technologies that service management on the terminal device is not refined enough.

Actions of the AMF network element in steps S601 to S615b may be performed by the processor 401 in the communication device 400 shown in FIG. 4 by invoking the application program code stored in the memory 403. This is not limited in this embodiment.

Figure 7A:
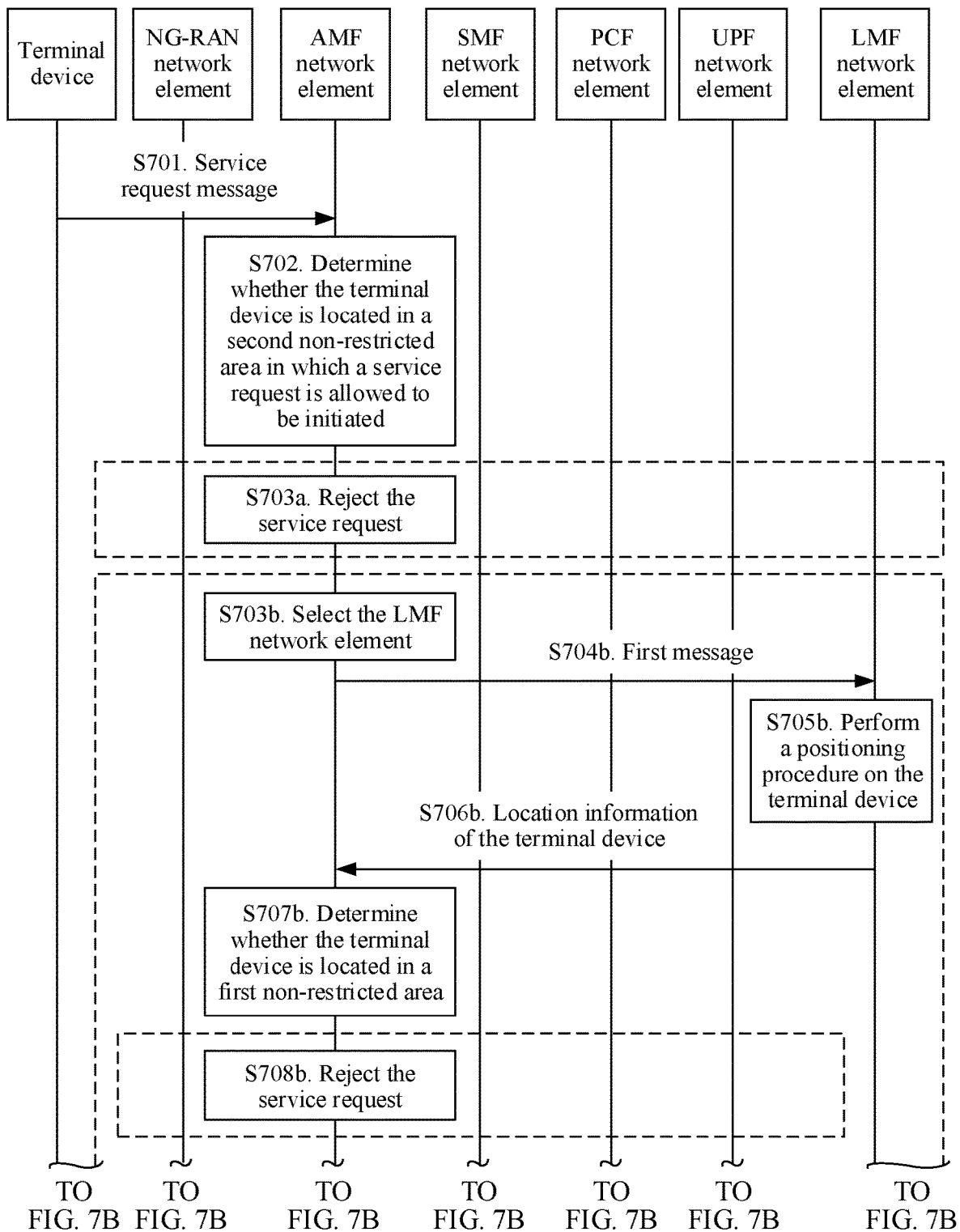
FIG. 7A and FIG. 7B are a schematic flowchart 3 of a service processing method according to an embodiment of this application.
Figure 7B:
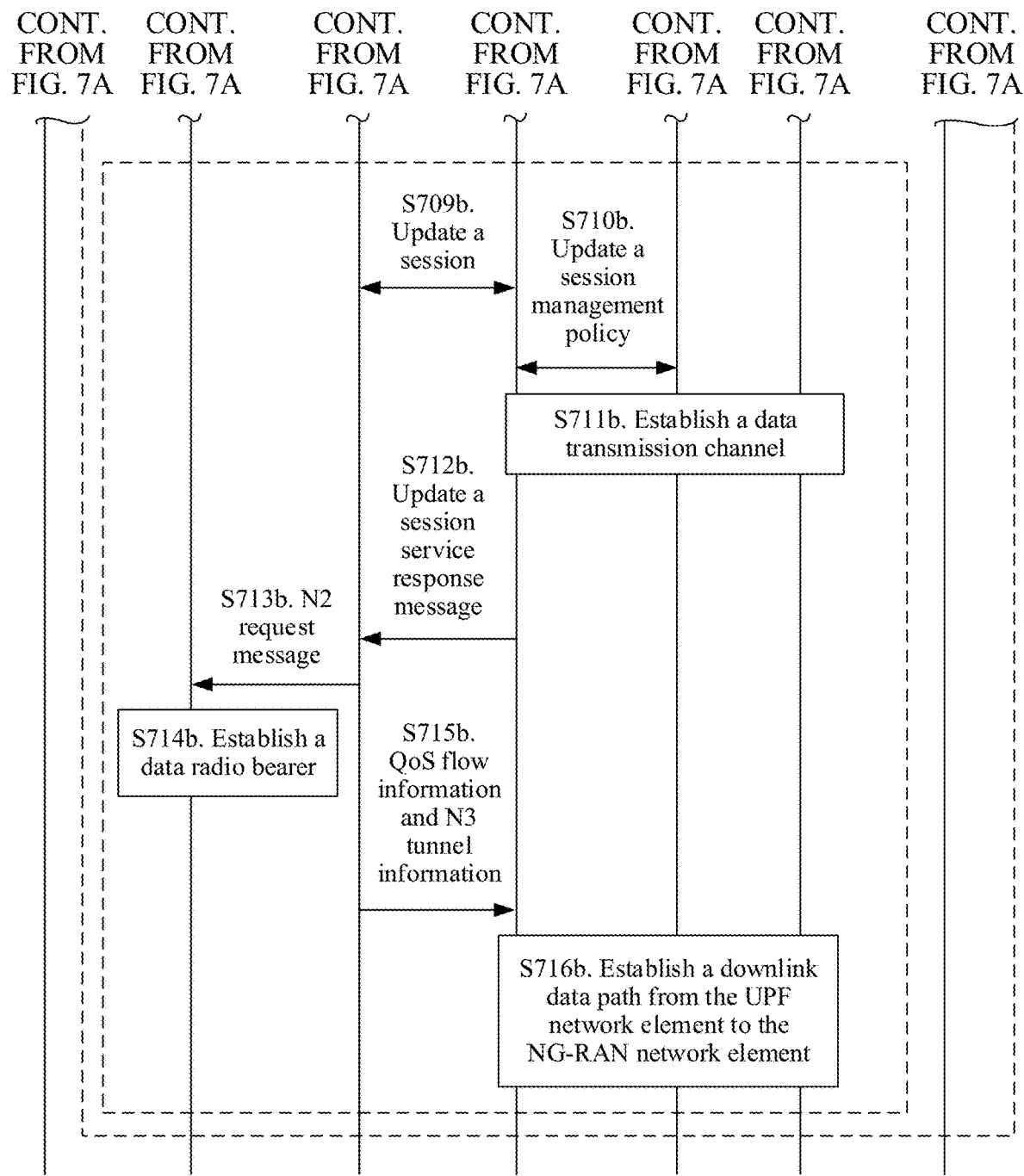

Optionally, for example, the communication system shown in FIG. 1 is applied to the 5G network shown in FIG. 3, the first network element is the AMF network element, and the second network element is the LMF network element. FIG. 7A and FIG. 7B show a service processing method according to an embodiment of this application. The service processing method may be applied to a session request procedure, and includes the following steps.

S701. A terminal device sends a service request message to an AMF network element; and the AMF network element receives the service request message from the terminal device.

S702. The AMF network element determines whether the terminal device is located in a second non-restricted area in which the terminal device is allowed to initiate a service request.

For related implementation of step S702, refer to step S503 in the embodiment shown in FIG. 5. Details are not described herein again.

In a possible implementation, if the AMF network element determines that the terminal device is not located in the second non-restricted area, the service processing method provided in this embodiment of this application includes the following step S703a:

S703a. The AMF network element rejects the service request.

For related implementation of steps S701 to S703a, refer to current technologies. Details are not described herein.

In another possible implementation, if the AMF network element determines that the terminal device is located in the second non-restricted area, the service processing method provided in this embodiment of this application includes the following steps S703b to S707b:

S703b to S707b are the same as steps S506b to S510b in the embodiment shown in FIG. 5.

In a possible implementation, if the AMF network element determines that the terminal device is not located in the first non-restricted area, the service processing method provided in this embodiment of this application includes the following step S708b:

S708b. The AMF network element rejects the service request of the terminal device.

To be specific, if the AMF network element determines that the terminal device is not located in the first non-restricted area, the AMF network element disallows the terminal device to obtain the service by using the service request. For example, the AMF network element may reject the service request of the terminal device by stopping continuing performing the service request procedure or initiating an access network release procedure.

In another possible implementation, if the terminal device is located in the first non-restricted area, the service processing method provided in this embodiment of this application includes the following steps S709b to 716b.

S709b. The AMF network element updates a session.

For example, the AMF network element may select a corresponding SMF network element based on a prestored mapping relationship between a session identifier and an SMF network element, to invoke a session service of the selected SMF network element to trigger a session update, and continue the service request procedure. This is not specifically limited in this embodiment of this application.

To be specific, if the terminal device is located in the first non-restricted area, the AMF network element allows the terminal device to obtain the service by using the service request procedure.

S710b. The SMF network element and the PCF network element update a session management policy, and obtain a session policy rule based on a decision of the PCF network element.

S711b. The SMF network element manages a UPF network element to establish a data transmission channel.

Specifically, the SMF may establish, based on whether an old UPF network element (old-UPF) needs to be deleted, a channel for indirectly forwarding data.

S712b. The SMF network element sends, to the AMF network element, a response message for updating the session service.

S713b. The AMF network element sends an N2 request message to an NG-RAN network element; and the NG-RAN network element receives the N2 request message from the AMF network element.

The N2 request message is used to request the NG-RAN network element to establish a radio resource.

S714b. The NG-RAN network element establishes a data radio bearer (data radio bearer, DRB).

Specifically, the NG-RAN network element may establish, by using an RRC reconfiguration message, a DRB corresponding to a quality of service (quality of service, QoS) flow. This is not specifically limited in this embodiment of this application.

S715b. The AMF network element sends, to the SMF network element by using the session service, QoS flow information received or rejected by the AMF network element and N3 tunnel information of the NG-RAN network element; and the SMF network element receives the QoS flow information from the AMF network element and the N3 tunnel information.

S716b. The SMF network element establishes a downlink data path from the UPF network element to the NG-RAN network element.

In this embodiment of this application, the AMF network element can obtain the location information from the LMF network element by sending, to the LMF network element, the first message for requesting to obtain the location information of the terminal device, so that the AMF network element determines, based on the location information of the terminal device, whether the terminal device is located in the first non-restricted area. If the terminal device is located in the first non-restricted area, the AMF network element continues the service request procedure, so that the terminal device can obtain the service by using the service request procedure. If the terminal device is not located in the first non-restricted area, the AMF network element rejects the service request of the terminal device, so that the terminal device is not allowed to obtain the service by using the service request procedure. In other words, in this embodiment of this application, the AMF network element can perform service management on the terminal device based on the location information of the terminal device, and therefore can perform refined service management on the terminal device in a small geographical range. This avoids a problem in the current technologies that service management on the terminal device is not refined enough.

Actions of the AMF network element in steps S701 to S716b may be performed by the processor 401 in the communication device 400 shown in FIG. 4 by invoking the application program code stored in the memory 403. This is not limited in this embodiment.

Based on the foregoing embodiments of this application, in a registration procedure of the terminal device, service management may be performed on the terminal device by using the service processing method shown in FIG. 5. In a session establishment procedure, service management may be performed on the terminal device by using the service processing method shown in FIG. 6A and FIG. 6B. In a service request procedure, service management may be performed on the terminal device by using the service processing method shown in FIG. 7A and FIG. 7B. It may be understood that the location information of the terminal device changes with user activities. Therefore, even if the terminal device successfully registers with a network (or obtained the service by using the session establishment request or the service request), the location information of the terminal device still needs to be periodically obtained, and service management is performed on the terminal device based on latest location information of the terminal device.

Figure 8:
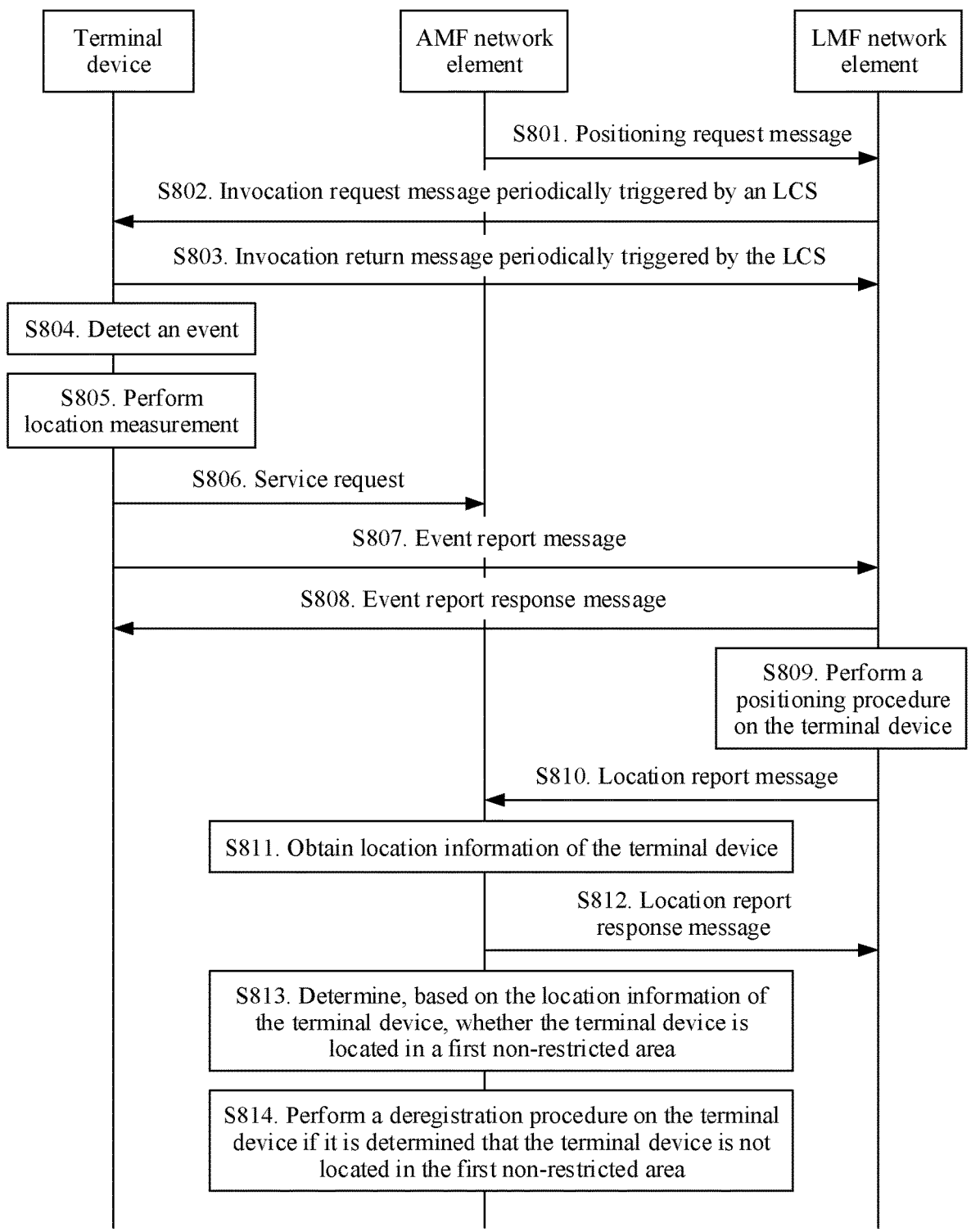
FIG. 8 is a schematic flowchart 4 of a service processing method according to an embodiment of this application.

In this case, an embodiment of this application provides another service processing method. For example, the communication system shown in FIG. 1 is still applied to the 5G network shown in FIG. 3, the first network element is the AMF network element, and the second network element is the LMF network element. As shown in FIG. 8, the method includes the following steps:

S801. The AMF network element sends a positioning request message (Nlmf_location_Determinlocation Request) to the LMF network element; and the LMF network element receives the positioning request message from the AMF network element.

The positioning request message (Nlmf_location_Determinlocation Request) is used to request to periodically perform an LCS on a terminal device, and the positioning request message further includes a periodicity value for performing the LCS.

S802. The LMF network element sends, to the terminal device, an invocation request message (LCS Periodic-Triggered Invoke Request) periodically triggered by the LCS; and the terminal device receives the invocation request message from the LMF network element.

S803. The terminal device sends, to the LMF network element, an invocation return message (LCS Periodic-Triggered Invoke Return Result) periodically triggered by the LCS; and the terminal device receives the invocation return message from the LMF network element.

S804. The terminal device detects an event.

S805. The terminal device performs location measurement.

S806. The terminal device initiates a service request, for example, by sending a service request to an AMF network element.

S807. The terminal device sends an event report message to the LMF network element; and the LMF network element receives the event report message from the terminal device.

S808. The LMF network element sends an event report response message to the terminal device; and the terminal device receives the event report response message from the LMF network element.

S809. The LMF network element performs a positioning procedure on the terminal device, to obtain location information of the terminal device.

S810. The LMF network element sends a location report message to the AMF network element; and the AMF network element receives the location report message from the LMF network element.

S811. The AMF network element obtains the location information of the terminal device based on the location report message.

S812. The AMF network element sends a location report response message to the LMF network element; and the LMF network element receives the location report response message from the AMF network element.

For related implementation of steps S801 to S812, refer to current technologies. Details are not described herein.

S813. The AMF network element determines, based on the location information of the terminal device, whether the terminal device is located in a first non-restricted area.

S814. If the terminal device is not located in the first non-restricted area, the AMF network element performs a deregistration procedure on the terminal device.

Similarly, corresponding to the session establishment procedure, step S814 may be replaced with the following step: If the AMF network element determines that the terminal device is not located in the first non-restricted area, the AMF network element initiates a session deletion procedure.

Alternatively, optionally, if the AMF network element determines that the terminal device is not located in the first non-restricted area, the AMF network element may notify the SMF network element to initiate a session deletion procedure.

It should be noted that the session deletion procedure herein is a procedure for deleting a PDU session, and the PDU session is a PDU session that the terminal device requests to establish.

Similarly, corresponding to the service request procedure, step S814 may be replaced with the following step: If the AMF network element determines that the terminal device is not located in the first non-restricted area, the AMF network element initiates an access network release procedure.

In this embodiment of this application, the AMF network element can obtain the location information from the LMF network element by sending the positioning request message to the LMF network element, to determine, based on the location information of the terminal device, whether the terminal device is located in the first non-restricted area. If the terminal device is not located in the first non-restricted area, the AMF network element performs the deregistration procedure on the terminal device, to disallow the terminal device to obtain the service. In other words, in this embodiment of this application, the AMF network element can perform service management on the terminal device based on the location information of the terminal device, and therefore can perform refined service management on the terminal device in a small geographical range. This avoids a problem in the current technologies that service management on the terminal device is not refined enough.

Actions of the AMF network element in steps S801 to S814 may be performed by the processor 401 in the communication device 400 shown in FIG. 4 by invoking the application program code stored in the memory 403. This is not limited in this embodiment.

Figure 9A:
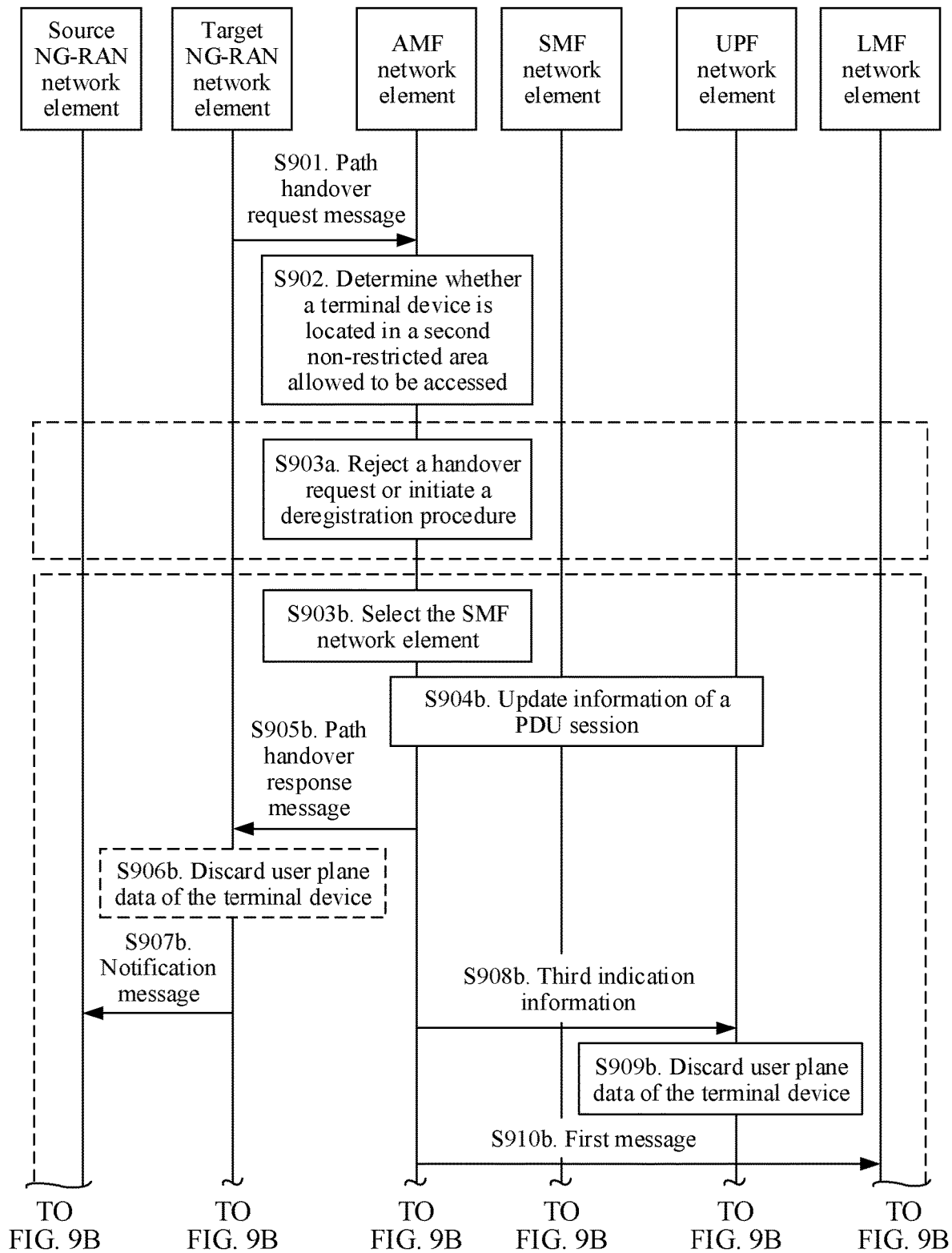
FIG. 9A and FIG. 9B are a schematic flowchart 5 of a service processing method according to an embodiment of this application.
Figure 9B:
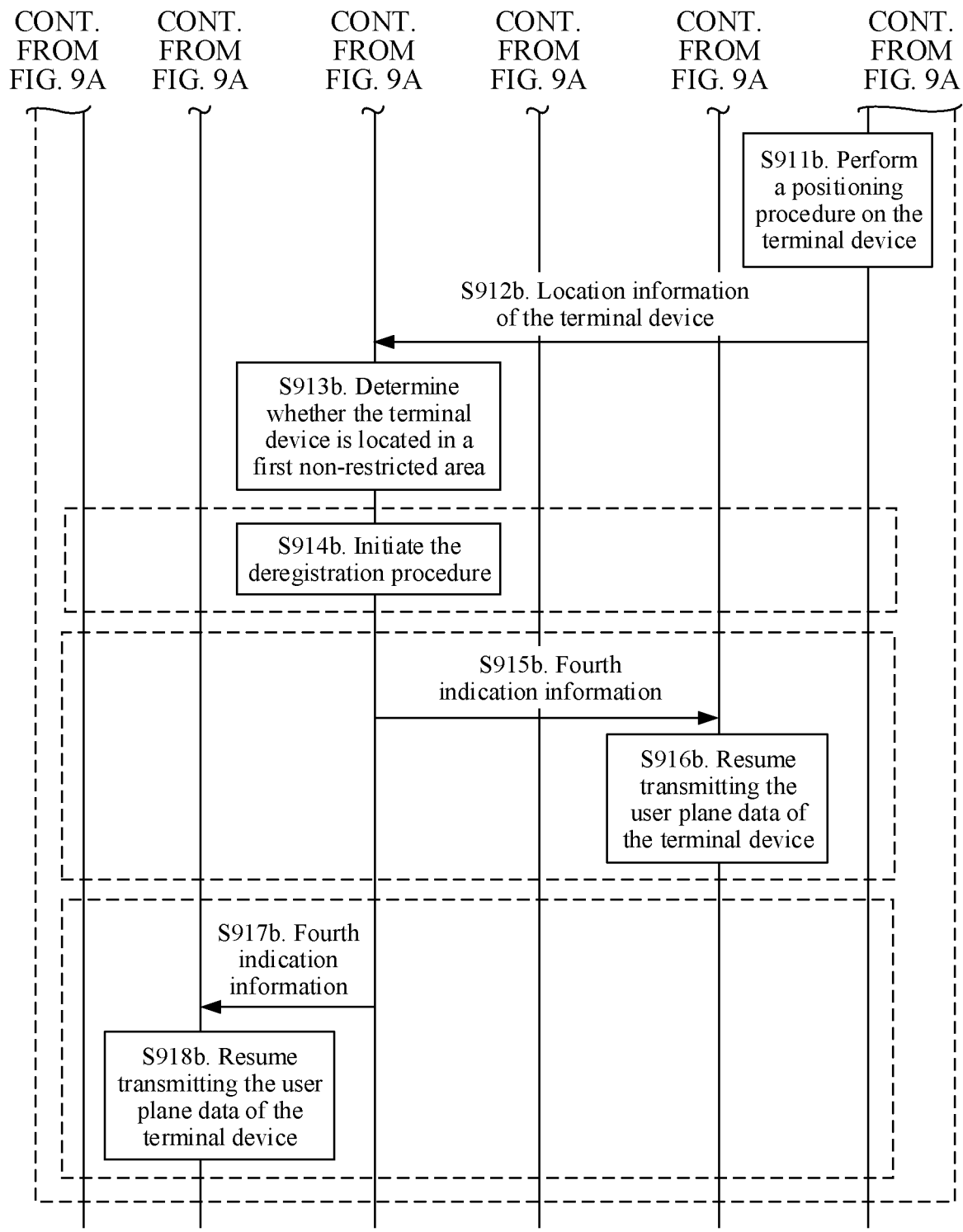

Optionally, for example, the communication system shown in FIG. 2 is applied to the 5G network shown in FIG. 3, the first network element is the AMF network element, the second network element is the LMF network element, and the third network element is the UPF network element or the target NG-RAN network element. FIG. 9A and FIG. 9B show a service processing method according to an embodiment of this application. The service processing method may be applied to a handover procedure in a registration procedure, and includes the following steps:

S901. A target NG-RAN network element of a terminal device sends a path handover request message to the AMF network element; and the AMF network element receives the path handover request message from the target NG-RAN network element.

The target NG-RAN network element of the terminal device is an access network device accessed by the terminal device after handover.

S902. The AMF network element determines whether the terminal device is located in a second non-restricted area allowed to be accessed.

For related implementation of step S902, refer to step S503 in the embodiment shown in FIG. 5. Details are not described herein again.

It should be noted that if the service processing method provided in this embodiment of this application is applied to a handover procedure in the session establishment procedure, the "second non-restricted area allowed to be accessed" in step S902 is replaced with the "second non-restricted area in which a session is allowed to be established". Similarly, if the service processing method provided in this embodiment of this application is applied to a handover procedure in the session establishment procedure, the "second non-restricted area allowed to be accessed" in step S902 is replaced with the "second non-restricted area in which a service request is allowed to be initiated".

In a possible implementation, if the AMF network element determines that the terminal device is not located in the second non-restricted area, the service processing method provided in this embodiment of this application includes the following step S903a:

S903a. The AMF network element rejects a path handover request of the target NG-RAN network element; or the AMF network element initiates a deregistration procedure on the terminal device.

Alternatively, in another possible implementation, if determining that the terminal device is located in the second non-restricted area, the AMF network element performs the handover procedure on the terminal device. In other words, the service processing method provided in this embodiment of this application includes the following steps S903b to S918b:

S903b. The AMF network element selects an SMF network element.

For example, the AMF network element may select a corresponding SMF network element based on an ID of a PDU session that is successfully handed over or that fails to be handed over and a locally stored SM context of the terminal device. This is not specifically limited in this embodiment of this application.

S904b. The AMF network element notifies the SMF network element to update information of the PDU session.

S905b. The AMF network element sends a path handover response message to the target NG-RAN network element; and the target NG-RAN network element receives the path handover response message from the AMF network element.

Optionally, the path handover response message carries second indication information, and the second indication information is used to indicate that the target NG-RAN network element is not capable of transmitting user plane data of the terminal device currently. For example, the second indication information may be, for example, a service forbidden indication (service forbidden indication). This is not limited in this embodiment of this application.

It should be noted that if the service processing method provided in this embodiment of this application is applied to a handover procedure in the session establishment procedure, the second indication information herein is used to indicate to discard user plane data of a session (the session that the terminal device requests to establish).

Optionally, as shown in FIG. 9A and FIG. 9B, if the path handover response message carries second indication information, the service processing method provided in this embodiment of this application further includes the following step S906b:

S906b. The target NG-RAN network element discards user plane data of the terminal device as indicated by the second indication information.

Further, the service processing method provided in this embodiment of this application further includes the following step S907b:

S907b. The target NG-RAN network element sends a notification message to a source NG-RAN network element, to notify the source NG-RAN network element to release a resource; and the source NG-RAN network element receives the notification message from the target NG-RAN network element.

The source NG-RAN network element of the terminal device is an NG-RAN network element accessed by the terminal device before handover.

S908b. The AMF network element sends third indication information to a UPF network element; and the UPF network element receives the third indication information from the AMF network element.

The third indication information is used to indicate that the UPF network element is not capable of transmitting the user plane data of the terminal device currently.

It should be noted that if the service processing method provided in this embodiment of this application is applied to a handover procedure in the session establishment procedure, the third indication information is used to indicate the UPF network element to discard the user plane data of the session that the terminal device requests to establish.

S909b. The UPF network element discards the user plane data of the terminal device as indicated by the third indication information.

S910b to S913b are the same as steps S507b to S510b in the embodiment shown in FIG. 5.

In a possible implementation, if the AMF network element determines that the terminal device is not located in the first non-restricted area, the service processing method provided in this embodiment of this application further includes the following step S914b:

S914b. The AMF network element initiates a deregistration procedure on the terminal device.

To be specific, if determining that the terminal device is not located in the first non-restricted area, the AMF network element deregisters the terminal device, so that the terminal device is not allowed to obtain the service.

It should be noted that if the service processing method provided in this embodiment of this application is applied to a handover procedure in the session establishment procedure, step S914b needs to be replaced with the following step: The AMF network element initiates a session deletion procedure.

Alternatively, optionally, if the AMF network element determines that the terminal device is not located in the first non-restricted area, the AMF network element may notify the SMF network element to initiate a session deletion procedure.

Similarly, corresponding to a handover procedure in the service request procedure, step S914b may be replaced with the following step: The AMF network element initiates an access network release procedure.

In another possible implementation, when the third network element is the UPF network element, if the terminal device is located in the first non-restricted area, the service processing method provided in this embodiment of this application further includes the following steps S915b and S916b:

S915b. The AMF network element sends fourth indication information to the UPF network element; and the UPF network element receives the fourth indication information from the AMF network element.

The fourth indication information is used to indicate the UPF network element to resume transmitting the user plane data of the terminal device. For example, the fourth indication information may be, for example, a service forbidden cancel indication (service forbidden cancel indication). This is not limited in this embodiment of this application.

It should be noted that if the service processing method provided in this embodiment of this application is applied to a handover procedure in the session establishment procedure, the fourth indication information herein is used to indicate to resume transmitting the user plane data of the session that the terminal device requests to establish.

S916b. The UPF network element resumes transmitting the user plane data of the terminal device as indicated by the fourth indication information.

In still another possible implementation, when the third network element is the target NG-RAN network element, if the terminal device is located in the first non-restricted area, the service processing method provided in this embodiment of this application includes the following steps S917b and S918b:

S917b. The AMF network element sends the fourth indication information to the target NG-RAN network element; and the target NG-RAN network element receives the fourth indication information from the AMF network element.

S918b. The target NG-RAN network element resumes transmitting the user plane data of the terminal device as indicated by the fourth indication information.

Similarly, if the service processing method provided in this embodiment of this application is applied to a handover procedure in the session establishment procedure, the fourth indication information herein is used to indicate to resume transmitting the user plane data of the session that the terminal device requests to establish.

In this embodiment of this application, the AMF network element can obtain the location information from the LMF network element by sending, to the LMF network element, the first message for requesting to obtain the location information of the terminal device, and determine, based on the location information of the terminal device, whether the terminal device is located in the first non-restricted area. If the terminal device is not located in the first non-restricted area, the AMF network element initiates the deregistration procedure on the terminal device, to disallow the terminal device to obtain the service. If the terminal device is located in the first non-restricted area, the AMF network element sends indication information to the UPF network element, to indicate to resume transmitting the user plane data of the terminal device, to allow the terminal device to obtain the service. In other words, in this embodiment of this application, the AMF network element can perform service management on the terminal device based on the location information of the terminal device, and therefore can perform refined service management on the terminal device in a small geographical range. This avoids a problem in the current technologies that service management on the terminal device is not refined enough.

Actions of the AMF network element in steps S901 to S918b may be performed by the processor 401 in the communication device 400 shown in FIG. 4 by invoking the application program code stored in the memory 403. This is not limited in this embodiment.

It may be understood that, in the foregoing embodiments, the methods and/or the steps implemented by the first network element 100 may alternatively be implemented by a component that can be used for the first network element 100.

The foregoing describes the solutions provided in embodiments of this application mainly from a perspective of interaction between network elements. Correspondingly, an embodiment of this application further provides a communication apparatus. The communication apparatus may be the first network element 100 in the foregoing method embodiments, or an apparatus including the first network element 100, or a component that can be used for the first network element 100. It may be understood that, to implement the foregoing functions, the communication apparatus includes a corresponding hardware structure and/or software module for executing the functions. A person skilled in the art should be easily aware that, with reference to units and algorithm steps in the examples described in the embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 10:
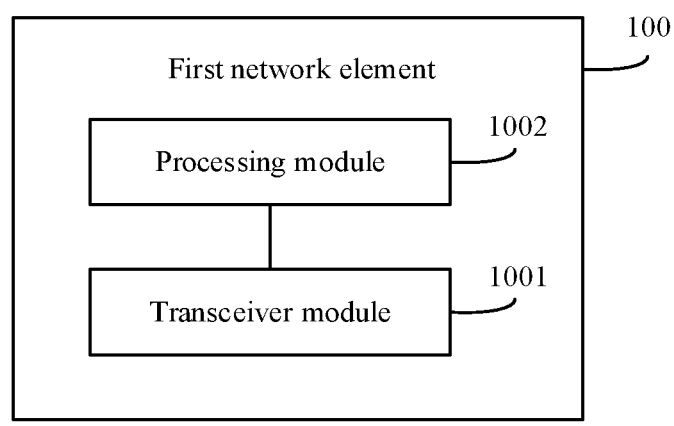
FIG. 10 is a schematic diagram of structure of a first network element according to an embodiment of this application.

For example, the communication apparatus is the first network element 100 in the foregoing method embodiments. FIG. 10 is a schematic diagram of a structure of the first network element 100. The first network element 100 includes a transceiver module 1001 and a processing module 1002. The transceiver module 1001 may also be referred to as a transceiver unit, and is configured to implement a transceiver function. For example, the transceiver module 1001 may be a transceiver circuit, a transceiver, or a communication interface.

The transceiver module 1001 is configured to send a first message to a second network element, where the first message is used to request to obtain location information of a terminal device. The transceiver module 1001 is further configured to receive the location information from the second network element. The processing module 1002 is configured to determine, based on the location information, whether the terminal device is located in a first non-restricted area. The processing module 1002 is further configured to allow the terminal device to obtain a service if the terminal device is located in the first non-restricted area. Alternatively, the processing module 1002 is further configured to disallow the terminal device to obtain a service if the terminal device is not located in the first non-restricted area Optionally, the processing module 1002 is further configured to determine that the terminal device is located in a second non-restricted area before the transceiver module 1001 sends the first message to the second network element, where a range of the second non-restricted area is a tracking area range or a cell range.

Optionally, the transceiver module 1001 is further configured to send a registration accept message to the terminal device after the processing module 1002 determines that the terminal device is located in the second non-restricted area, where the registration accept message carries first indication information, and the first indication information is used to indicate that the terminal device is not allowed to obtain the service currently.

In a possible implementation, that the processing module 1002 is configured to allow the terminal device to obtain a service includes: sending second indication information to the terminal device by using the transceiver module 1001, where the second indication information is used to indicate the terminal device to resume obtaining the service.

Optionally, the transceiver module 1001 is further configured to receive a second message from the terminal device, where the second message is used to request to establish a session or the second message is used to request the service; and the processing module 1002 is further configured to reject the terminal device to obtain the service after determining that the terminal device is located in the second non-restricted area.

Optionally, the processing module 1002 is further configured to perform a handover procedure on the terminal device after determining that the terminal device is located in the second non-restricted area; and the transceiver module 1001 is specifically configured to send the first message to the second network element after the processing module 1002 completes the handover procedure on the terminal device.

Optionally, the transceiver module 1001 is further configured to send third indication information to a third network element after the processing module 1002 determines that the terminal device is located in the second non-restricted area, where the third indication information is used to indicate that the third network element is not capable of transmitting user plane data of the terminal device currently.

Optionally, that the processing module 1002 is configured to allow the terminal device to obtain a service includes: sending fourth indication information to the third network element by using the transceiver module 1001, where the fourth indication information is used to indicate the third network element to resume transmitting the user plane data of the terminal device.

Optionally, the first network element 100 provided in this embodiment of this application is used in a session establishment procedure, a service request procedure, a registration procedure, or a handover procedure.

Optionally, that the transceiver module 1001 is configured to receive the location information from the second network element includes: receiving the location information periodically sent by the second network element.

Optionally, in this embodiment of this application, a range of the first non-restricted area is less than the range of the second non-restricted area.

All related content of steps in the foregoing method embodiments may be cited in function descriptions of corresponding functional modules, and details are not described herein again.

In this embodiment, the first network element 100 is presented in a form of functional modules obtained through division in an integrated manner. The "module" herein may be a specific ASIC, a circuit, a processor executing one or more software or firmware programs, a memory, an integrated logic circuit, and/or another component that can provide the foregoing function. In a simple embodiment, a person skilled in the art may figure out that the first network element 100 may be in a form of the communication device 400 shown in FIG. 4.

For example, the processor 401 in the communication device 400 shown in FIG. 4 may invoke the computer-executable instructions stored in the memory 403, to enable the communication device 400 to perform the service processing method in the foregoing method embodiments.

Specifically, a function/an implementation process of the transceiver module 1001 and the processing module 1002 in FIG. 10 may be implemented by the processor 401 in the communication device 400 shown in FIG. 4 by invoking the computer-executable instructions stored in the memory 403. Alternatively, a function/an implementation process of the processing module 1002 in FIG. 10 may be implemented by the processor 401 in the communication device 400 shown in FIG. 4 by invoking the computer-executable instructions stored in the memory 403. A function/an implementation process of the transceiver module 1001 in FIG. 10 may be implemented by using the communication interface 404 in the communication device 400 shown in FIG. 4.

The first network element 100 provided in this embodiment may perform the foregoing method. Therefore, for a technical effect that can be achieved by the first network element 100, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method processes. The processor may be built into a SoC (system-on-a-chip) or an ASIC, or may be an independent semiconductor chip. In addition to a core configured to perform calculation or processing by executing software instructions, the processor may further include a necessary hardware accelerator, for example, a field programmable gate array (field programmable gate array, FPGA), a PLD (programmable logic device), or a logic circuit that implements a dedicated logic operation.

When the foregoing modules or units are implemented by using hardware, the hardware may be any one or any combination of a CPU, a microprocessor, a digital signal processing (digital signal processing, DSP) chip, a microcontroller unit (microcontroller unit, MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method processes.

Optionally, an embodiment of this application further provides a communication apparatus (where for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may alternatively not be located in the communication apparatus. When the communication apparatus is a chip system, the communication apparatus may include a chip, or may include a chip and another discrete component. This is not specifically limited in this embodiment of this application.

In addition, an embodiment of this application may provide a computer-readable storage medium. The computer-readable storage medium stores instructions. When the instructions are run, a function of the first network element in FIG. 5 to FIG. 9A and FIG. 9B is implemented.

An embodiment of this application provides a computer program product including instructions. The computer program product includes the instructions, and when the instructions are run, a function of the first network element in FIG. 5 to FIG. 9A and FIG. 9B is implemented.

An embodiment of this application provides a communication system. The communication system includes a first network element and a second network element. The first network element is configured to perform steps performed by the first network element in FIG. 5 to FIG. 9A and FIG. 9B. The second network element is configured to: receive a first message from the first network element, and send location information of a terminal device to the first network element.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the process or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising (comprising)" does not exclude another component or another step, and "a" or "one" does not exclude a meaning of "a plurality". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the scope of this application. Correspondingly, the specification and accompanying drawings are merely example descriptions of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A service processing method, comprising:
sending, by a first network element, a first message directly from the first network element to a second network element, wherein the first message requests to obtain location information of a terminal device, the first network element is an access and mobility management function (AMF) network element or a session management function (SMF) network element, and the second network element is a location management function (LMF) network element;
receiving, by the first network element, the location information from the second network element;
determining, by the first network element based on the location information, whether the terminal device is located in a first non-restricted area;
in response to determining that the terminal device is located in the first non-restricted area, allowing, by the first network element, the terminal device to obtain a service; and
in response to determining that the terminal device is not located in the first non-restricted area, disallowing, by the first network element, the terminal device to obtain a service.

2. The method according to claim 1, wherein before the sending, by a first network element, a first message to a second network element, the method further comprises:
determining, by the first network element, that the terminal device is located in a second non-restricted area, wherein a range of the second non-restricted area is a tracking area range or a cell range.

3. The method according to claim 2, wherein after the determining, by the first network element, that the terminal device is located in a second non-restricted area, the method further comprises:
sending, by the first network element, a registration accept message to the terminal device, wherein the registration accept message carries first indication information, and the first indication information indicates that the terminal device is not allowed to obtain the service currently.

4. The method according to claim 1, wherein the allowing, by the first network element, the terminal device to obtain a service comprises:
sending, by the first network element, second indication information to the terminal device, wherein the second indication information indicates the terminal device to resume obtaining the service.

5. The method according to claim 2, wherein before the determining, by the first network element based on the location information, whether the terminal device is located in a first non-restricted area, the method further comprises:
rejecting, by the first network element, the terminal device to obtain the service when the first network element receives a second message from the terminal device, wherein the second message requests to establish a session or the second message requests the service.

6. The method according to claim 2, wherein after the determining, by the first network element, that the terminal device is located in a second non-restricted area, the method further comprises:
performing, by the first network element, a handover procedure on the terminal device; and
the sending, by a first network element, a first message to a second network element comprises:
sending, by the first network element, the first message to the second network element after determining that the handover procedure on the terminal device is completed.

7. The method according to claim 6, wherein after the determining, by the first network element, that the terminal device is located in a second non-restricted area, the method further comprises:
sending, by the first network element, third indication information to a third network element, wherein the third indication information indicates that the third network element is not capable of transmitting user plane data of the terminal device currently.

8. The method according to claim 7, wherein the allowing, by the first network element, the terminal device to obtain a service comprises:
sending, by the first network element, fourth indication information to the third network element, wherein the fourth indication information indicates the third network element to resume transmitting the user plane data of the terminal device.

9. The method according to claim 1, wherein the method is performed in a session establishment procedure, a service request procedure, a registration procedure, or a handover procedure.

10. The method according to claim 1, wherein the receiving, by the first network element, the location information from the second network element comprises:
receiving, by the first network element, the location information periodically sent from the second network element.

11. The method according to claim 2, wherein a range of the first non-restricted area is smaller than the range of the second non-restricted area.

12. The method according to claim 1, further comprising:
sending, by the second network element, the location information to the first network element.

13. A communication apparatus, comprising:
at least one processor; and
one or more memories including computer-executable instructions that, when executed by the at least one processor, cause the communication apparatus to:
send a first message directly from a first network element to a second network element, wherein the first message requests to obtain location information of a terminal device, the first network element is an access and mobility management function (AMF) network element or a session management function (SMF) network element, and the second network element is a location management function (LMF) network element;
receive the location information from the second network element;
determine, based on the location information, whether the terminal device is located in a first non-restricted area;
in response to determining that the terminal device is located in the first non-restricted area, allow the terminal device to obtain a service; and
in response to determining that the terminal device is not located in the first non-restricted area, disallow the terminal device to obtain a service.

14. The communication apparatus according to claim 13, wherein the computer-executable instructions, when executed by the at least one processor, further cause the communication apparatus to:
determine that the terminal device is located in a second non-restricted area before sending the first message, wherein a range of the second non-restricted area is a tracking area range or a cell range.

15. The communication apparatus according to claim 14, wherein the computer-executable instructions, when executed by the at least one processor, further cause the communication apparatus to:
send a registration accept message to the terminal device after determining that the terminal device is located in the second non-restricted area, wherein the registration accept message carries first indication information, and the first indication information indicates that the terminal device is not allowed to obtain the service currently.

16. The communication apparatus according to claim 13, wherein the computer-executable instructions, when executed by the at least one processor, further cause the communication apparatus to:
send second indication information to the terminal device, wherein the second indication information indicates the terminal device to resume obtaining the service.

17. The communication apparatus according to claim 14, wherein the computer-executable instructions, when executed by the at least one processor, further cause the communication apparatus to:
perform a handover procedure on the terminal device after the determining that the terminal device is located in the second non-restricted area.

18. The communication apparatus according to claim 17, wherein the computer-executable instructions, when executed by the at least one processor, further cause the communication apparatus to:
send the first message to the second network element after determining that the handover procedure on the terminal device is completed.

19. The communication apparatus according to claim 17, wherein the computer-executable instructions, when executed by the at least one processor, cause the communication apparatus to:

send third indication information to a third network element after the determining that the terminal device is located in the second non-restricted area, wherein the third indication information indicates that the third network element is not capable of transmitting user plane data of the terminal device currently.

20. A communication system, comprising a first network element and a second network element, wherein the first network element comprises at least one processor and one or more memories including computer-executable instructions that, when executed by the at least one processor, cause the first network element to:

send a first message directly from the first network element to the second network element, wherein the first message requests to obtain location information of a terminal device, the first network element is an access and mobility management function (AMF) network element or a session management function (SMF) network element, and the second network element is a location management function (LMF) network element;

receive the location information from the second network element;

determine, based on the location information, whether the terminal device is located in a first non-restricted area;

in response to determining that the terminal device is located in the first non-restricted area, allow the terminal device to obtain a service; and in response to determining that the terminal device is not located in the first non-restricted area, disallow the terminal device to obtain a service.

* * * * *